(12) United States Patent
Fu et al.

(10) Patent No.: US 7,691,789 B2
(45) Date of Patent: Apr. 6, 2010

(54) SELF-CLEANING WELL CONTROL FLUID

(75) Inventors: Diankui Fu, Tyumen (RU); Steve Russell, Moscow (RU); Mathew Samuel, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 994 days.

(21) Appl. No.: 11/278,191

(22) Filed: Mar. 31, 2006

(65) Prior Publication Data
US 2007/0238622 A1 Oct. 11, 2007

(51) Int. Cl.
C09K 8/68 (2006.01)
(52) U.S. Cl. .................................. 507/203; 166/308.1
(58) Field of Classification Search ................. 507/203; 166/308.1
See application file for complete search history.

(56) References Cited

U.S. PATENT DOCUMENTS

| | | | |
|---|---|---|---|
| 3,998,272 | A | 12/1976 | Maly |
| 4,848,467 | A | 7/1989 | Cantu et al. |
| 4,957,165 | A | 9/1990 | Cantu et al. |
| 4,957,166 | A | 9/1990 | Sydansk |
| 4,986,355 | A | 1/1991 | Casad et al. |
| 5,258,137 | A | 11/1993 | Bonekamp et al. |
| 5,330,005 | A | 7/1994 | Card et al. |
| 5,377,760 | A | 1/1995 | Merrill |
| 5,439,055 | A | 8/1995 | Card et al. |
| 5,501,275 | A | 3/1996 | Card et al. |
| 5,551,516 | A | 9/1996 | Norman et al. |
| 5,924,295 | A | 7/1999 | Park et al. |
| 5,964,295 | A | 10/1999 | Brown et al. |
| 5,979,555 | A | 11/1999 | Gadberry et al. |
| 5,979,557 | A | 11/1999 | Card et al. |
| 6,025,304 | A | 2/2000 | Southwell |
| 6,035,936 | A | 3/2000 | Whalen |
| 6,085,844 | A | 7/2000 | Palmer |
| 6,140,277 | A | 10/2000 | Tibbles et al. |
| 6,172,011 | B1 | 1/2001 | Card et al. |
| 6,258,859 | B1 | 7/2001 | Dahayanake et al. |
| 6,419,019 | B1 | 7/2002 | Palmer |
| 6,435,277 | B1 | 8/2002 | Qu et al. |
| 6,509,301 | B1 | 1/2003 | Vollmer |
| 6,599,863 | B1 | 7/2003 | Palmer et al. |
| 6,667,280 | B2 | 12/2003 | Chang et al. |
| 6,703,352 | B2 | 3/2004 | Dahayanake et al. |
| 6,777,377 | B2 | 8/2004 | Myers |
| 6,938,693 | B2 | 9/2005 | Boney |
| 7,066,260 | B2 * | 6/2006 | Sullivan et al. ........... 166/280.1 |
| 7,166,560 | B2 * | 1/2007 | Still et al. .................... 507/219 |
| 2002/0007949 | A1 | 1/2002 | Tolman et al. |
| 2003/0062160 | A1 | 4/2003 | Boney |
| 2003/0134751 | A1 | 7/2003 | Nelson et al. |
| 2004/0094300 | A1 * | 5/2004 | Sullivan et al. ........... 166/308.1 |
| 2004/0152601 | A1 | 8/2004 | Still et al. |
| 2004/0152604 | A1 | 8/2004 | Qu et al. |
| 2005/0113263 | A1 | 5/2005 | Brown et al. |
| 2005/0233911 | A1 | 10/2005 | Samuel |
| 2006/0032633 | A1 | 2/2006 | Nguyen |

FOREIGN PATENT DOCUMENTS

EP 0278540 B1 8/1992

OTHER PUBLICATIONS

U.S. Appl. No. 11/156,966—Degradable Fiber Systems for Stimulation.

* cited by examiner

Primary Examiner—Timothy J. Kugel
Assistant Examiner—Atnaf Admasu
(74) Attorney, Agent, or Firm—David Cate; Martin Rzaniak; Robin Nara

(57) ABSTRACT

A composition and method is given for a well control fluid that is injected into a well during completion or remediation and prevents fluid flow from a formation into the well during operations (such as shut-in, or placement or adjustment of tools/hardware) when no fluid flow is desired. The composition includes a viscoelastic surfactant fluid system (VES) and a decomposable first solid material, preferably in fiber form, that forms a pack or plug in the well at the location where fluid would otherwise leak off, and then decomposes without intervention to release a product that is a breaker for the surfactant or the micelles of the VES. The composition optionally also contains a pH control agent and a second solid (that may also be a fluid loss agent) that affect the decomposition of the first solid.

25 Claims, 5 Drawing Sheets

SELF-CLEANING WELL CONTROL FLUID

BACKGROUND OF THE INVENTION

The Invention relates to completing wells drilled into subterranean formations. More particularly it relates to methods of killing a well, that is preventing fluid from flowing from the formation into the wellbore, during completion or remediation. Most particularly, it relates to killing a well without damaging it, that is without decreasing subsequent production, especially after hydraulic fracturing while a well is being prepared for production.

There are many wellbore operations in which it is necessary to allow a well to be in fluid communication with the formation it penetrates for a period of time under conditions where fluid could flow between the formation and the well unless steps were taken to prevent this. For example, after hydraulic fracturing, matrix acidizing or acid fracturing, frac packing, or gravel packing is completed it might be several days before appropriate hardware is installed in the next step of the completion (for example an electric submersible pump). Some method, which we will call "well control", must be used to prevent fluid flow into the well during that time. Typically, the well is at least partially filled with a "kill fluid" or a "kill pill". This fluid is commonly dense enough that the column of fluid provides a hydrostatic pressure greater than the pressure of fluids in the formation. The well control fluid is also commonly viscosified to reduce flow, and may contain solids, such as fluid loss additives, that are designed to block fluid flow paths. One of the serious drawbacks to viscosifying a kill fluid or including fluid loss additives, is that one or both of these features may damage the well, the fracture, or the formation. This could necessitate an additional step to attempt to clean up the damage. It may be difficult or impossible to remove all of the fluid or all of the solids, especially if some of the fluid and/or some of the solids invade the fracture or the formation. Also, after some methods of downhole completion (for example after installation of an ESP) remedial treatments are not possible The solids used in well control fluids are usually substantially insoluble, or sparingly or slowly soluble, materials (typically those also commonly used as fluid loss additives and/or filter cake components). Removal of the solids is typically accomplished either by a mechanical means (scraping, jetting, or the like), or by subsequent addition of a fluid containing an agent (such as an acid, a base, an oxidizer, or an enzyme) that dissolves at least a portion of the solids. These removal methods usually require a tool or addition of another fluid (for example to change the pH or to add a chemical). Sometimes the operator may rely on the flow of produced fluids, but this method requires fluid flow and often results in slow or incomplete solids removal. Sometimes a breaker can be incorporated in the well control fluid but these must normally be delayed (for example by esterification or encapsulation) and they are often expensive and/or difficult to place and/or difficult to trigger.

SUMMARY OF THE INVENTION

A first embodiment is a method of treating a well penetrating a subterranean formation involving injecting a slurry including a gelled viscoelastic surfactant fluid and a decomposable first solid, the first solid being capable of reducing fluid flow from the well to the formation or from the formation to the well, allowing the slurry to prevent the fluid flow for a selected period of time, and then allowing the first solid to decompose and the viscoelastic surfactant fluid to break. The well may be under-pressured. In one embodiment, the gelled viscoelastic surfactant fluid breaks after the selected period of time. The gelled viscoelastic surfactant fluid may break with the aid of a decomposition product of the first solid. The decomposable first solid may be decomposed after the selected time period.

In another embodiment, the gelled viscoelastic surfactant fluid also contains a pH control agent. The first solid decomposes to form acid and the gelled viscoelastic surfactant fluid is capable of being broken by acid and the pH control agent is present in an amount sufficient to neutralize acid formed until the end of the selected period of time, and/or the pH control agent is present in an amount sufficient to maintain a pH at which the gelled viscoelastic surfactant fluid is not broken until the end of the selected period of time and/or the pH control agent delays the rate of decomposition of the decomposable first solid.

The pH control agent is selected from amines and alkaline earth, ammonium, and alkali metal salts of sesquicarbonates, carbonates, oxalates, hydroxides, oxides, bicarbonates, and organic carboxylates.

In another embodiment, the slurry also contains a dissolvable second solid capable of accelerating the decomposition of the decomposable first solid. The dissolvable second solid may be a pH control agent and/or a fluid loss additive.

In yet another embodiment, the decomposable first solid is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of those materials. A preferred decomposable first solid is polylactic acid. The decomposable first solid may also be selected from polymers of acrylic acid, aramides, acrylonitrile, polyamides, vinylidene, olefins, diolefins, polyester, polyurethane, vinyl alcohol, and vinyl chloride. Then a preferred decomposable first solid is polyethylene terephthalate.

In a further embodiment, the decomposable first solid is in a form selected from the group consisting of fibers, beads, shavings, films, ribbons, and platelets. Preferably, the decomposable first solid is in the form of fibers.

In yet another embodiment, the decomposable first solid degrades at formation temperature in a time between about 4 hours and 100 days. The pH control agent is present in an amount sufficient to neutralize any acid present in the decomposable first solid before the injection and to neutralize any acid generated by the decomposable first solid before the end of the selected period of time. The acid is neutralized to an extent sufficient to maintain the viscosity of the fluid in the presence of the decomposable first solid above about 50 cP at a shear rate of 100 $\sec^{-1}$ at the temperature of the formation until a plug of the decomposable first solid has formed. Preferably the viscosity is maintained above about 10 cP at a shear rate of 100 $\sec^{-1}$ at the temperature of the formation until a plug of decomposable first solid has formed In another embodiment, the pH control agent is selected from the group consisting of amines and alkaline earth, ammonium, and alkali metal salts of sesquicarbonates, carbonates, oxalates, hydroxides, oxides, bicarbonates, organic carboxylates, and sodium sesquicarbonate. The pH control agent may also be selected from triethanolamine and tetraethylenepentamine.

In yet another embodiment, the viscoelastic surfactant is selected from the group consisting of a betaine and an amidoamine oxide. Preferably, the betaine is erucic amidopropyl dimethyl betaine or oleyl amidopropyl dimethyl betaine.

DETAILED DESCRIPTION OF THE INVENTION

Figure 1:
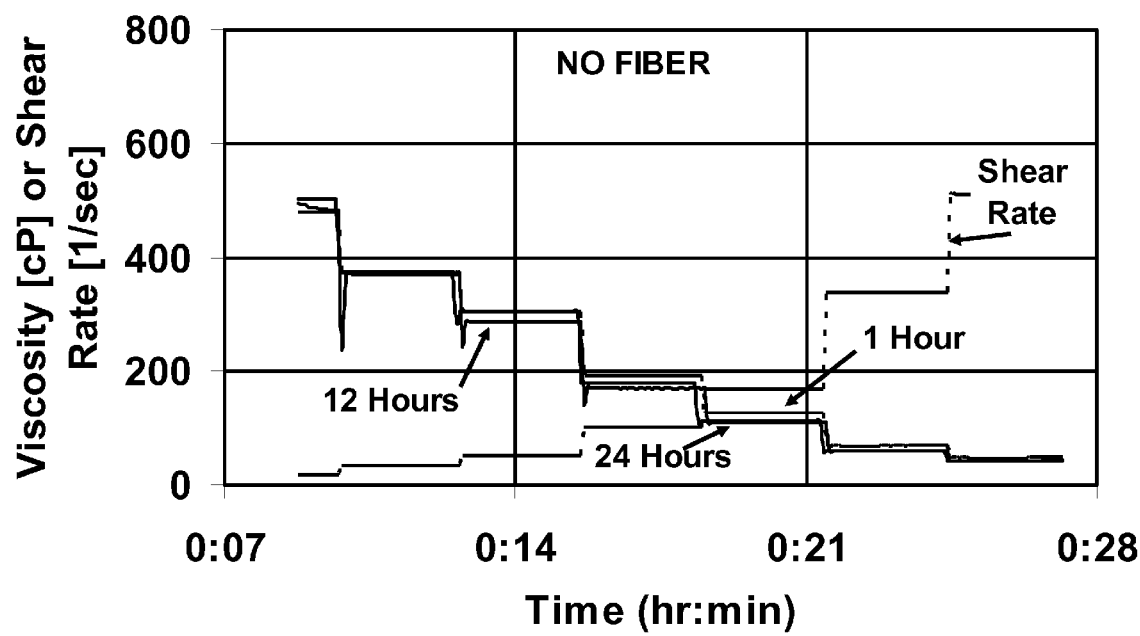
FIG. 1 shows the viscosity at various shear rates of a slurry containing a viscoelastic surfactant system in water maintained at 93° C. for up to one day.

We have found that a slurry of a decomposable first solid material in an aqueous fluid viscosified with a viscoelastic surfactant system (VES) makes an excellent well control fluid. The well control comes from the decomposable first solid material, for example in fiber form, bridging where the fracture joins the well (at, near, and/or in the perforations if the well is cased), as well as from the viscosity of the VES fluid system. However, the principle function of the gelled VES fluid system is to carry the decomposable first solid (such as fiber) downhole. For example, fibrous decomposable first solids form a plug of material in locations that would otherwise leak off fluid, and it is primarily the plug that provides well control. The treatment must be designed so that the plug lasts as long as well control is needed. After the plug has formed, the viscosity of the VES fluid system is less important. Generally there is some flow of fluid from the well control pill into the formation as the well control fluid slurry is placed; this results in the build-up of a plug or pack of the decomposable first solid at the location where the leak-off occurs. Preferably the decomposable first solid material and the VES decompose without the need for a trigger, and optionally one or more decomposition products acts as a breaker for the VES. The rate of decomposition of the decomposable first solid and VES are, for example, controlled by the temperature, the choice of and surface area of the decomposable first solid, and the chemistry of other components of the fluid. A second solid material may optionally be included, initially to help bridge off and/or later to catalyze the decomposition of the decomposable first solid.

Suitable materials for the decomposable first solid component of the of the Invention include substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Other materials suitable for use are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable materials for the decomposable first solid of the Invention are also described in U. S. Patent Application Publication Nos. 2003/002195 and 2004/0152601, both of which are hereby incorporated by reference and are assigned to the assignee of the present application.

Other polymers, for example those that degrade at other temperatures, or other pH's, or those that have different chemical compatibilities, may be used, for example polyvinyl alcohol, optionally with suitable carrier fluid adjustment. More examples of polymers that may be used as the decomposable first solid of the Invention are those described (as fibers) in U.S. Pat. No. 6,599,863 which is assigned to the assignee of the present application and hereby incorporated in its entirety. Examples from that patent polymers of acrylic acid, aramides, acrylonitrile, polyamides, vinylidene, olefins, diolefins, polyester, polyurethane, vinyl alcohol, and vinyl chloride. A particular suitable example is polyethylene terephthalate (PET).

Excellent materials for the decomposable first solid of the Invention are solid cyclic dimers, or solid polymers, of certain organic acids, that hydrolyze under known and controllable conditions of temperature, time and pH; the degradation products are organic acids. One example of a suitable material is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of gylycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. Generally the cyclic dimers are polymerized to form the final polymer from which the decomposable first solid is made, but for low temperature operations decomposable first solid may be made directly from the solid cyclic dimmers. The as-received commercially available materials may contain some free acid, for example up to about 5%) and some solvent, typically water.

NatureWorks LLC, Minnetonka, Minn., USA, owned by Cargill Inc., Minneapolis, Minn., USA, produces the solid cyclic lactic acid dimer called "lactide" and from it produces lactic acid polymers, or polylactates, with varying molecular weights and degrees of crystallinity, under the generic trade name NatureWorks™ PLA. The PLA's currently available from NatureWorks most commonly have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from NatureWorks typically have crystalline melt temperatures of from about 120 to about 170° C., but others are obtainable. Poly(d,1-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring 1-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product (which is one possible function of the voluntary second solid of the Invention).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the decomposable first solids dissolve very slowly in water before they hydrolyze.

These decomposable first solids typically contain ester or amide linkages; they typically are most stable at an intermediate pH and hydrolyze more rapidly as the pH is raised or lowered. The stabilities as a function of pH are well known. Some materials useful as decomposable first solids decompose (for example, hydrolyze) more rapidly at low pH than at high, and some decompose (for example hydrolyze) more rapidly at high pH than at low. Although it would be desirable to use polyglycolic acid and similar materials as a decomposable first solid for VES fluid systems, this creates a problem because these materials often contain small amounts of acid as commercially obtained and furthermore these materials typically start to hydrolyze to form acids as they are being used. The acid contained or generated by the material decreases the pH of the VES fluid system; this typically decreases the viscosity, because the viscosity of many VES fluid systems is quite pH sensitive. Therefore, simply adding the PGA or similar material to the VES fluid system would not be an acceptable solution to the problem. Inherently present monomeric acid or early dissolution of some of the PGA or similar material would deleteriously affect the viscosity of the system. When this is the case, a pH control agent, for example as the second solid, becomes necessary.

Similarly, many of the suitable VES surfactants also contain hydrolysable functionalities such as esters and amides and they also decompose more rapidly at high or low pH than at intermediate pH's. Most commonly, they decompose more rapidly at low pH than at high. Fir these reasons, it is often desirable to maintain the slurry of the invention at a moderately high pH with a pH control agent until well control is no longer needed and then to allow the pH to fall.

The decomposable first solid of the Invention may be coated to slow the decomposition (for example hydrolysis). Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the materials for the decomposable first solids of the Invention by any means delays the hydrolysis. Note that coating here may refer to encapsulation or simply to changing the surface by chemical reaction or by forming or adding a thin film of another material, for example an oil. The decomposition does not occur until water contacts the decomposable first solids.

The decomposable first solid self-destructs in situ, that is in the wellbore, in perforations (if the well was cased), as a component of a filter cake on the walls of a wellbore, in a fracture, or in natural fractures or vugs in a formation. A particular advantage of these materials is that most decomposable first solids of the Invention and the decomposition products such as low molecular weight organic acids are non-toxic and are biodegradable.

The decomposable first solid (such as a solid acid) may be manufactured and used in various solid shapes, including, but not limited to fibers, beads, films, shavings, ribbons and platelets; the most commonly used shape is fibers. If the decomposable first solid is in fiber form, then most commonly, straight fibers are used, although curved, crimped, spiral-shaped and other three dimensional fiber geometries are useful. Also, the fibers may be bundled together, or hooked on one or both ends. If the decomposable first solid is used in the form of fibers, then typically the fiber length is at least about 2 millimeters, and the fiber diameter ranges from about 3 to about 200 microns. There appears to be no upper limit on the length of the fibers employed from the standpoint of utility. Handling, mixing, and pumping equipment dictate the practical upper limit for the length of fibers. If the decomposable first solid is used in the form of films, shavings, ribbons or platelets, then typically the largest dimension of the particles may be of a broad size range, for example from nanoparticles (for breaking a VES without the need for physical help in well control) to the size of proppants. The choice of decomposable first solid is made based primarily on the desired rates of hydrolysis and dissolution in the well control fluid to be used at the temperature at which it will be used. These choices may also be strongly influenced by the desired time before the delayed break. Similarly, the concentration of the pH control agent, if present, is based upon many factors that will be clear to one of ordinary skill in the art, including the concentrations and natures of the VES, the decomposable first solid, and any other additives, the temperature, and the desired time to break. The appropriate choice and concentration of all components can be determined by simple laboratory experiments, for example mixing all the components, heating to the job temperature, and monitoring the viscosity. The system may be used in any aqueous fluid from fresh water to heavy brines; a requirement is compatibility of the water with the VES system. Normally, well control fluids have high densities provided by high brine concentrations. The well control fluid may be batch-mixed or mixed on-the-fly.

The decomposable first solid, for example in fiber form, is present at a concentration of from about 1.2 to about 25 g/L (about 10 to about 200 pounds per thousand gallons fluid (ppt)). The preferred concentration of decomposable first solid, for example in fiber form, is from 6 to 18 g/L (from 50 to 150 pounds per thousand gallons fluid (ppt)). The most preferred concentration of decomposable first solid, for example in fiber form, is from 12 to 18 g/L (from 100 to 150 pounds per thousand gallons fluid (ppt)). The method works with as high a decomposable first solid concentration as can be pumped with available equipment, but lower concentrations require larger amounts of fluids to be pumped, so higher concentrations tend to be preferred. In practice, the decomposable first solid, for example in fiber form, is expected to form a plug, the decomposition of which is expected to be independent of the initial decomposable first solid, for example in fiber form, concentration. The viscosity range of the viscoelastic fluid necessary to carry the fiber to the proper location in the well to be controlled (measured without fiber) is from about 10 to about 50 cP at 100 sec$^{-1}$ although higher viscosities may be used for improved well control.

The combination of a pH control agent and a suitable decomposable first solid (such as a solid acid) as a method of maintaining the stability of a VES system (as well as maintaining the stability of the decomposable first solid) and then breaking it may be used with any VES system that is more stable at higher pH than it is at the pH's that result from the hydrolysis of the solid acid, provided that the entire well control fluid is compatible with the formation, the formation fluids, and any other fluids with which it may come in contact, for example a fracture fluid, and its components and additives. These VES's include cationic, anionic, nonionic, zwitterionic, amphoteric and mixed surfactant fluid systems, especially betaine zwitterionic viscoelastic surfactant fluid systems or amidoamine oxide surfactant fluid systems. Examples of suitable VES systems include those described in U.S. Pat. Nos. 5,551,516; 5,964,295; 5,979,555; 5,979,557; 6,140,277; 6,258,859 and 6,509,301, all hereby incorporated by reference. Some VES systems, for example some cationic systems, are not very sensitive to pH, and some VES systems, for example some anionic systems, are typically buffered to a pH of above 12 in normal use, and the solid acid/pH control agent combination of this Invention may not always be beneficial with such systems. VES's are often used with additional materials (such as but not limited to salts, co-surfactants, rheology enhancers, stabilizers and shear recovery enhancers) that improve or modify their performance.

Several types of zwitterionic surfactants have been found to be particularly useful when used to form the VES fluid system of the Invention. In general, suitable zwitterionic surfactants have the formula:

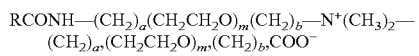
RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and CH$_2$CH$_2$O may also be oriented as OCH$_2$CH$_2$. Preferred surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J. U.S.A.) it is called Mirataine BET-O-30; it contains an oleyl acid amide group (including a C$_{17}$H$_{33}$ alkene tail group) and is supplied as about 30% active surfactant; the remainder is substantially water, sodium chloride, glycerol and propane-1,2-diol. An analogous suitable material, BET-E-40, was used in the experiments described above; one chemical name is erucylamidopropyl betaine. BET surfactants, and others that are suitable, are described in U.S. Pat. No. 6,258,859.

Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained C$_6$ to C$_{16}$ chain; further examples of this type of co-surfactant are those having a saturated or unsaturated, branched or straight-chained C$_8$ to C$_{16}$ chain. Other suitable examples of this type of co-surfactant, especially for BET-O-30, are certain chelating agents such as trisodium hydroxyethylethylenediamine triacetate.

Although the Invention has been described throughout using the term "VES", or "viscoelastic surfactant" to describe the non-polymeric viscosified aqueous fluid in the second stage, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. Nos. 6,035,936 and 6,509,301, hereby incorporated by reference.

VES fluid micelles are usually broken by the natural inflow of hydrocarbons and water or brine, but breakers such as certain salts, acids (especially organic acids), or alcohols are sometimes also used. Acids are known to damage or destroy either the micelle/vesicle structures formed by viscoelastic surfactants or, in some cases, the surfactants themselves, or both. Breaker aids such as activators, delay agents or stabilizers may also be used specifically in conjunction with the breakers.

We have found that when a number of decomposable first solid materials (for example solid dimers, oligomers, or polymers of simple acids, or copolymers of these materials with one another, examples being PGA (polyglycolic acid) and PLA (polylactic acid)), are used with a VES for which their decomposition products are a breaker, they should be used in combination with a suitable pH control agent that allows the VES fluid system to maintain its viscosity long enough for a plug of decomposable first solid to form if some of the solid acid hydrolyzes. The pH control agent may be dissolved in the original fluid (for example NaOH or Na$_2$CO$_3$) or it may be the second solid (for example CaCO$_3$). When the second solid is not needed physically for well control, it may still be used as a stabilizer and then as a delayed breaker for the VES fluid system. The pH control agent prevents the deleterious effects of the small amount of free acid that is typically found in as-received solid acids or other materials that may be used as the decomposable first solid, and also neutralizes any acid that may be generated by hydrolysis of the decomposable first solid during a treatment, before a break is desired. With the pH control agent present, the fluid does not become acidic enough to destroy the viscosity of the system until the pH control agent has been depleted. Then the additional acid, still forming as the solid acid (if one is used as the decomposable first solid) continues to hydrolyze and dissolve, breaks the fluid system. On the other hand, the pH control agent may impart a pH to the fluid that accelerates the hydrolysis of some decomposable first solids, which may need to be taken into account when designing a treatment if the hydrolysis rate is important. Also very important, is that the pH control agent must maintain a pH at which the decomposable first solid is stable, or decomposing only slowly, for the time period that well control is required. Once the choice of VES surfactant system and decomposable first solid has been made, all of these factors can readily be balanced by one skilled in the art to ensure that at the downhole conditions the VES surfactant system lasts long enough to place a plug of the decomposable first solid, and that the plug of decomposable first solid lasts long enough to maintain well control for the desired period of time. (Conversely, of course, the times and conditions may be used to select the VES surfactant system and the decomposable first solid.)

Suitable pH control agents include, but are not limited to, sodium, potassium and ammonium sesquicarbonates, oxalates, carbonates, hydroxides, bicarbonates, and organic carboxylates such as acetates and polyacetates. Examples are sodium sesquicarbonate, sodium carbonate, and sodium hydroxide. Soluble oxides, including slowly soluble oxides such as MgO, may also be used. Amines and oligomeric amines, such as alkyl amines, hydroxyalkyl amines, anilines, pyridines, pyrimidines, quinolines, and pyrrolidines for example triethanolamine and tetraethylenepentamine, may also be used.

The choice of pH control agent depends in part upon the VES system used. For example, MgO generally precipitates anionic VES's but is suitable for cationic and zwitterionic VES's. Some salt-like inorganic-based pH control agents, such as carbonates, may deleteriously affect the rheology of some VES's that are sensitive to electrolyte concentration, so in those cases organic-based pH control agents such as amines would be the better choices.

The pH control agents may be added as solids or as solutions, typically concentrated for ease of transporting. The order of addition of the decomposable first solid (such as a solid acid), pH control agent, VES, and other components (such as salts) is not critical. The appropriate pH control agent concentration depends upon the solid acid concentration, the treatment temperature, and primarily upon the desired delay before the onset of the break. A factor that should be borne in mind is that excessive amounts of some pH control agents may promote hydrolysis of some decomposable first solids (such as solid acids) as well as hydrolysis of the VES.

The rate of decomposition of a particular decomposable first solid (such as a solid acid), having a particular chemical and physical make-up, including a coating if present, at a particular temperature and in contact with a fluid or fluids of a particular composition (for example pH and the concentration and nature of other components, especially electrolytes and optional pH control agents) and optionally in contact with a second solid material, is readily determined by a simple experiment: exposing the decomposable first solid (such as a solid acid) to the fluid or fluids under treatment conditions and monitoring the release of acid.

An important feature of the composition and method of the Invention is that the treatment is non-damaging and does not require intervention to clean up residue. This is because the viscoelastic fluid system, the decomposable first solid, and the second solid all spontaneously decompose into small non-damaging products, that typically are soluble in water, and leave no residue.

The slurry and method of the Invention are used in any wellbore operations (both completion and remediation) in which it is necessary to allow a well to be in fluid communication with the formation it penetrates, for a period of time, under conditions where fluid could flow between the formation and the well unless steps were taken to prevent this. For example, after hydraulic or acid fracturing, matrix acidizing, frac packing, or gravel packing is completed it might be several days before appropriate hardware is installed in the next step of the completion (for example an electric submersible pump). The composition and method of the Invention are used to prevent fluid flow into the well during that time, by at least partially filling the well with the composition. Normally, in order to reduce costs and not fill the entire well with the composition, the operator injects enough of the slurry of the Invention to provide a sufficient pack or plug of the decomposable first solid to kill the well. This injection is then followed by a spacer or post-flush fluid used to force fluid leak-off and create the pack or plug. Both the slurry, and the spacer or post-flush fluid if used, may be weighted to provide sufficient weight to the column of fluid to counter the formation pressure. When wells are under-pressured, weighted fluids would not be needed, although brines may be added to control clay swelling in sandstone reservoirs. Any spacer or post-flush material that might come into contact with the slurry of the Invention should contain sufficient pH control agent to delay the decomposition if desired.

Any additives normally used in such treatments may be included, provided that they are compatible with the other components and the desired results of the treatment. Such additives can include, but are not limited to anti-oxidants, corrosion inhibitors, biocides, etc. The wellbores treated can be vertical, deviated or horizontal. They can be completed with casing and perforations or open hole. The composition and method of the Invention are used in any type of formation, for example high or low permeability, sandstone or carbonate. Other forms of fluids sometimes used as carrier fluids or fracturing fluids may also be used in conjunction with the slurry of the Invention. For example, the carrier fluid may be an emulsion or may be foamed or energized.

The present Invention can be understood further from the following examples.

EXAMPLE 1

Experiments were run using a viscoelastic surfactant concentrate containing about 38% by weight erucic amidopropyl dimethyl betaine, about 23% isopropanol, about 5% sodium chloride, about 1% sodium naphthalene sulfonate, and the remainder water. As an example of a decomposable first solid, polylactic acid fibers were used. The fibers contained 12% water and 1% sizing. They had a denier of about 1.4 and were about 6 mm long.

Figure 2:
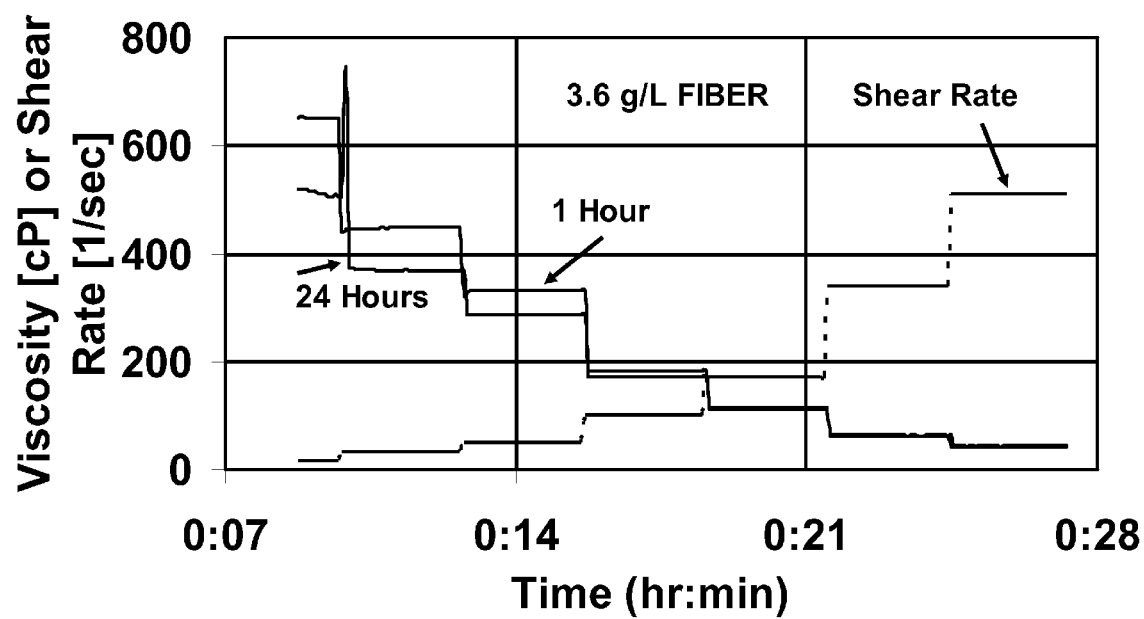
FIG. 2 shows an experiment like that of FIG. 1, except that 3.6 g/L of a decomposable solid of the Invention, in fiber form, was added.

FIG. 1 shows the viscosity at various shear rates of a fluid made by adding 8 weight % of this surfactant concentrate to water, and then maintaining the fluid at 93° C. for up to one day. FIG. 2 shows a similar experiment, except that 3.6 g/L of the fiber was added. It can be seen that in these experiments, the fiber had very little effect on the viscosity at shear rates from 17 to 511 $sec^{-1}$ and at times from 1 to 24 hours. This system would be stable for well control at this temperature fort at least one day. The fiber was visible in the system at the end of the experiment.

EXAMPLE 2

Figure 3:
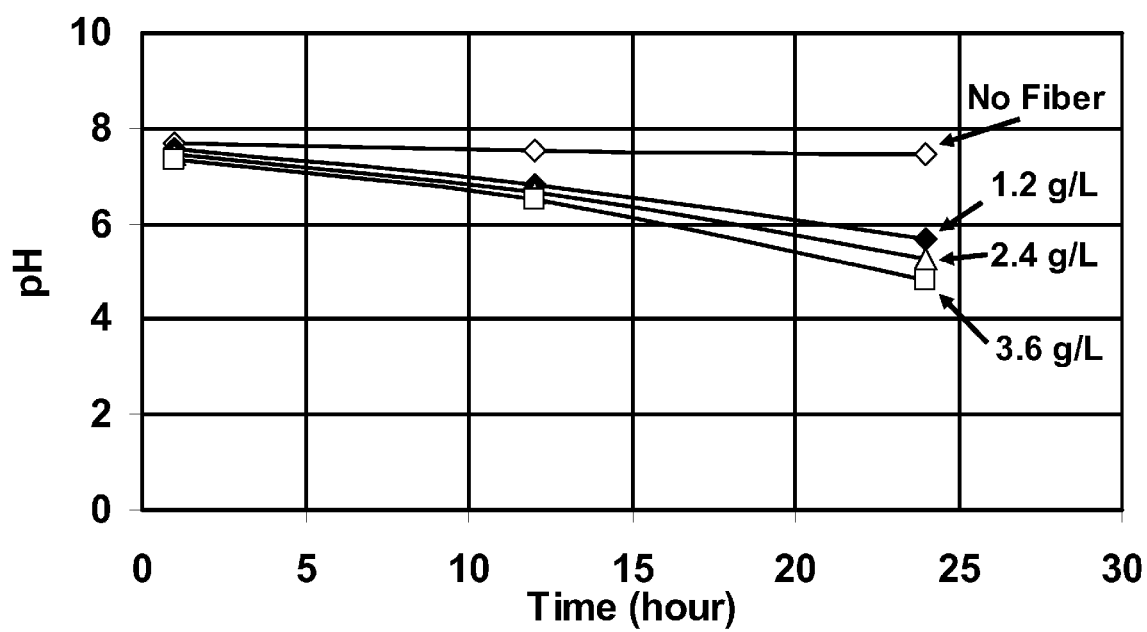
FIG. 3 shows the pH as a function of time for the same viscoelastic surfactant fluid system containing varying amounts of the same fiber.

Additional experiments were run with 1.2 g/L fiber and 2.4 g/L fiber. FIG. 3 shows the pH as a function of time at 93° C. for the four runs. The pH steadily decreased with time when the fiber was present, and the more fiber, the greater the decrease. This shows that the polylactic acid was very slowly decomposing, and if the experiments had been continued, the gels would have broken, because it is known that these gels are broken (and the hydrolysis of the surfactants accelerated) by strong acid or by the addition of sufficient organic acid.

EXAMPLE 3

Figure 4:
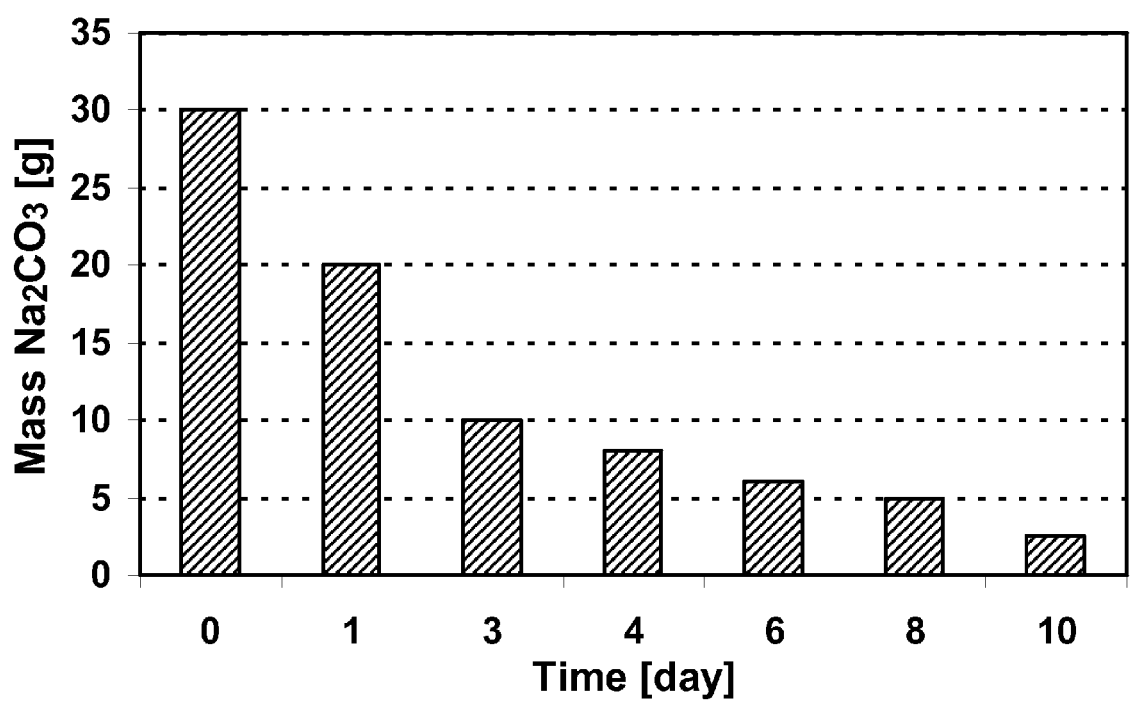
FIG. 4 shows the content of solid sodium carbonate remaining when a fluid containing a viscoelastic fluid system, KCl, a decomposable solid of the Invention, in fiber form, and solid sodium carbonate was monitored for 10 days.
Figure 5:
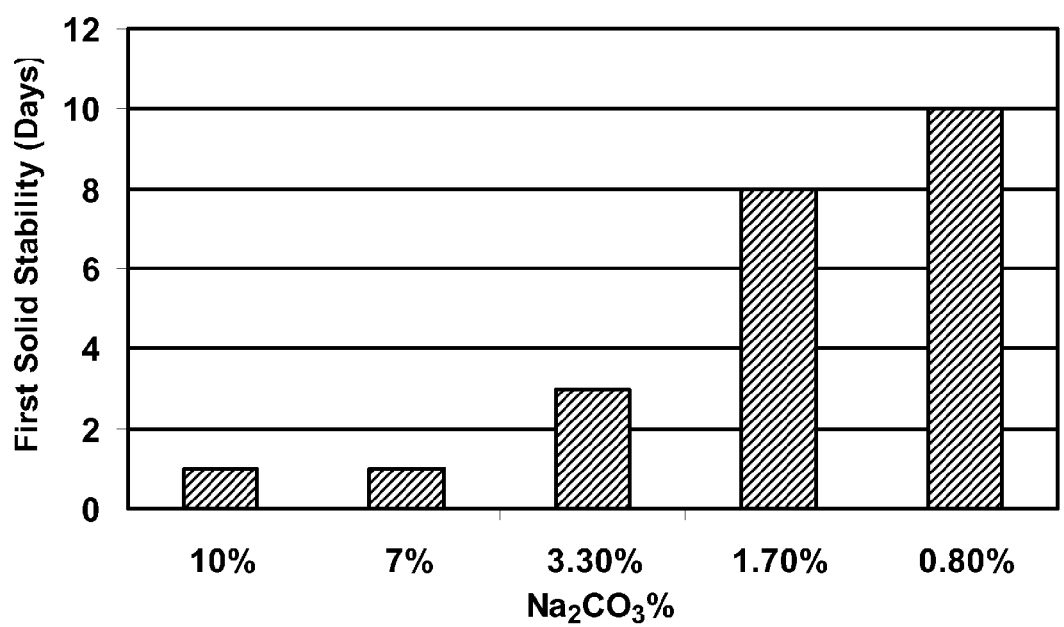
FIG. 5 shows the stability of the fiber in days in a similar fluid when varying amounts of solid sodium carbonate are added.

A fluid was made by adding 4% of the same surfactant concentrate used above, 7% KCl, varying amounts of solid sodium carbonate, 1.1 g (3.6 g/L) of the same fiber as used above, and a 2.5 cm (1 inch) long solid fiber plug (made from the same fiber), to 300 ml water. The physical appearances of the solid fiber plug and fluid were then monitored over time. FIG. 4 shows the days to 100% disappearance of the solid fiber plug at different initial solid sodium carbonate contents. It can be seen that the degradation of decomposable first solid (solid fiber material in plug form in this case) can be controlled this way over the range of from 1 to 10 days. FIG. 5 shows the same data as FIG. 4 but expressed as the days the plug survived vs. the initial amount of solid sodium carbonate present. The final pH in these fluids ranged from about 9.8 (with high initial solid sodium carbonate) to about 8.7 (with low initial solid sodium carbonate).

Having thus described our Invention, we claim:

1. A method for control treatment of a well penetrating a subterranean formation comprising:

a) injecting a slurry comprising a gelled viscoelastic surfactant fluid and a decomposable first solid,
b) placing the slurry to reduce a fluid flow from the well to the formation or from the formation to the well,
c) allowing the slurry to prevent the fluid flow for a selected period of time, and
d) then allowing the first solid to decompose and the viscoelastic surfactant fluid to break.

2. The method of claim 1 wherein said well is underpressured.

3. The method of claim 1 wherein said gelled viscoelastic surfactant fluid breaks after said selected period of time with the aid of a decomposition product of said first solid.

4. The method of claim 1 wherein said decomposable first solid is decomposed after said selected time period.

5. The method of claim 1 wherein said gelled viscoelastic surfactant fluid further comprises a pH control agent.

6. The method of claim 5 wherein said first solid decomposes to form acid and wherein said gelled viscoelastic surfactant fluid is capable of being broken by acid and wherein said pH control agent is present in an amount sufficient to neutralize acid formed until the end of said selected period of time.

7. The method of claim 5 wherein said first solid decomposes to form an acid and wherein said gelled viscoelastic surfactant fluid is capable of being broken by said acid, and wherein said pH control agent is present in an amount sufficient to maintain a pH at which said gelled viscoelastic surfactant fluid is not broken until the end of said selected period of time.

8. The method of claim 5 wherein said pH control agent delays the rate of decomposition of said decomposable first solid.

9. The method of claim 5 wherein said pH control agent is selected from the group consisting of amines and alkaline earth, ammonium, and alkali metal salts of sesquicarbonates, carbonates, oxalates, hydroxides, oxides, bicarbonates, and organic carboxylates.

10. The method of claim 1 wherein said slurry further comprises a dissolvable second solid capable of accelerating the decomposition of said decomposable first solid.

11. The method of claim 10 wherein said second solid is a pH control agent.

12. The method of claim 10 wherein said dissolvable second solid is a fluid loss additive.

13. The method of claim 1 wherein said decomposable first solid is selected from the group consisting of substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

14. The method of claim 13 wherein said decomposable first solid is polylactic acid.

15. The method of claim 1 wherein said decomposable first solid is selected from the group consisting of polymers of acrylic acid, aramides, acrylonitrile, polyamides, vinylidene, olefins, diolefins, polyester, polyurethane, vinyl alcohol, and vinyl chloride.

16. The method of claim 15 wherein said decomposable first solid is polyethylene terephthalate.

17. The method of claim 1 wherein said decomposable first solid is in a form selected from the group consisting of fibers, beads, shavings, films, ribbons, and platelets.

18. The method of claim 17 wherein said decomposable first solid is in the form of fibers.

19. The method of claim 18 wherein said pH control agent is present in an amount sufficient to neutralize any acid present in said decomposable first solid before the injection and to neutralize any acid generated by said decomposable first solid before the end of said selected period of time.

20. The method of claim 18 wherein acid is neutralized to an extent sufficient to maintain the viscosity of the fluid in the presence of said decomposable first solid above about 50 cP at a shear rate of 100 $sec^{-1}$ at the temperature of the formation until a plug of said decomposable first solid has formed.

21. The method of claim 20 wherein acid is neutralized to an extent sufficient to maintain the viscosity of the fluid in the presence of decomposable first solid above about 10 cP at a shear rate of 100 $sec^{-1}$ at the temperature of the formation until a plug of decomposable first solid has formed.

22. The method of claim 18 wherein said pH control agent is selected from the group consisting of amines and alkaline earth, ammonium and alkali metal salts of sesquicarbonates, carbonates, oxalates, hydroxides, oxides, bicarbonates, and organic carboxylates.

23. The method of claim 22 wherein said pH control agent is selected from sodium sesquicarbonate, triethanolamine and tetraethylenepentamine.

24. The method of claim 1 wherein said viscoelastic surfactant is selected from the group consisting of a betaine and an amidoamine oxide.

25. The method of claim 24 wherein said betaine is erucic amidopropyl dimethyl betaine or oleyl amidopropyl dimethyl betaine.

* * * * *